Patented Dec. 18, 1928.

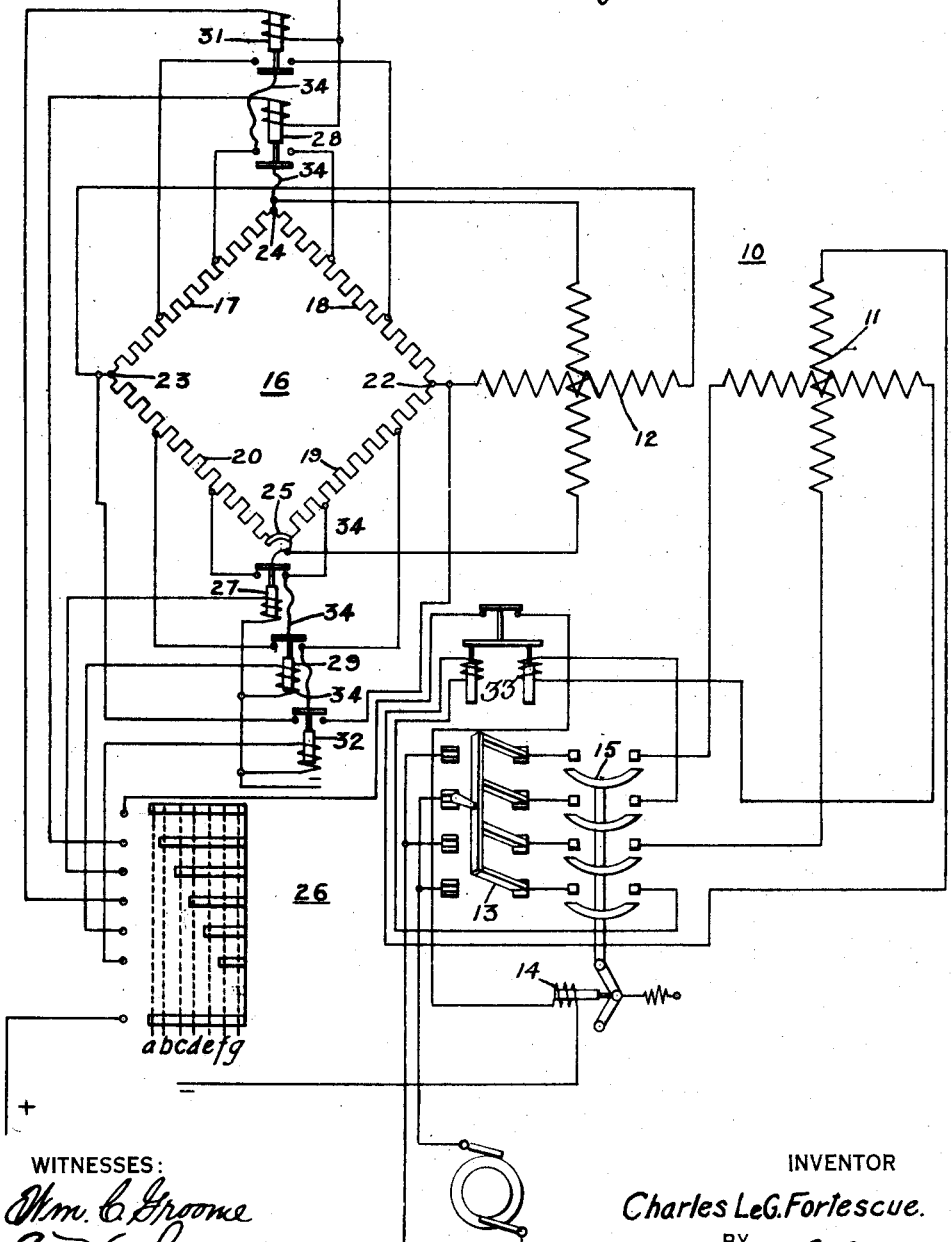

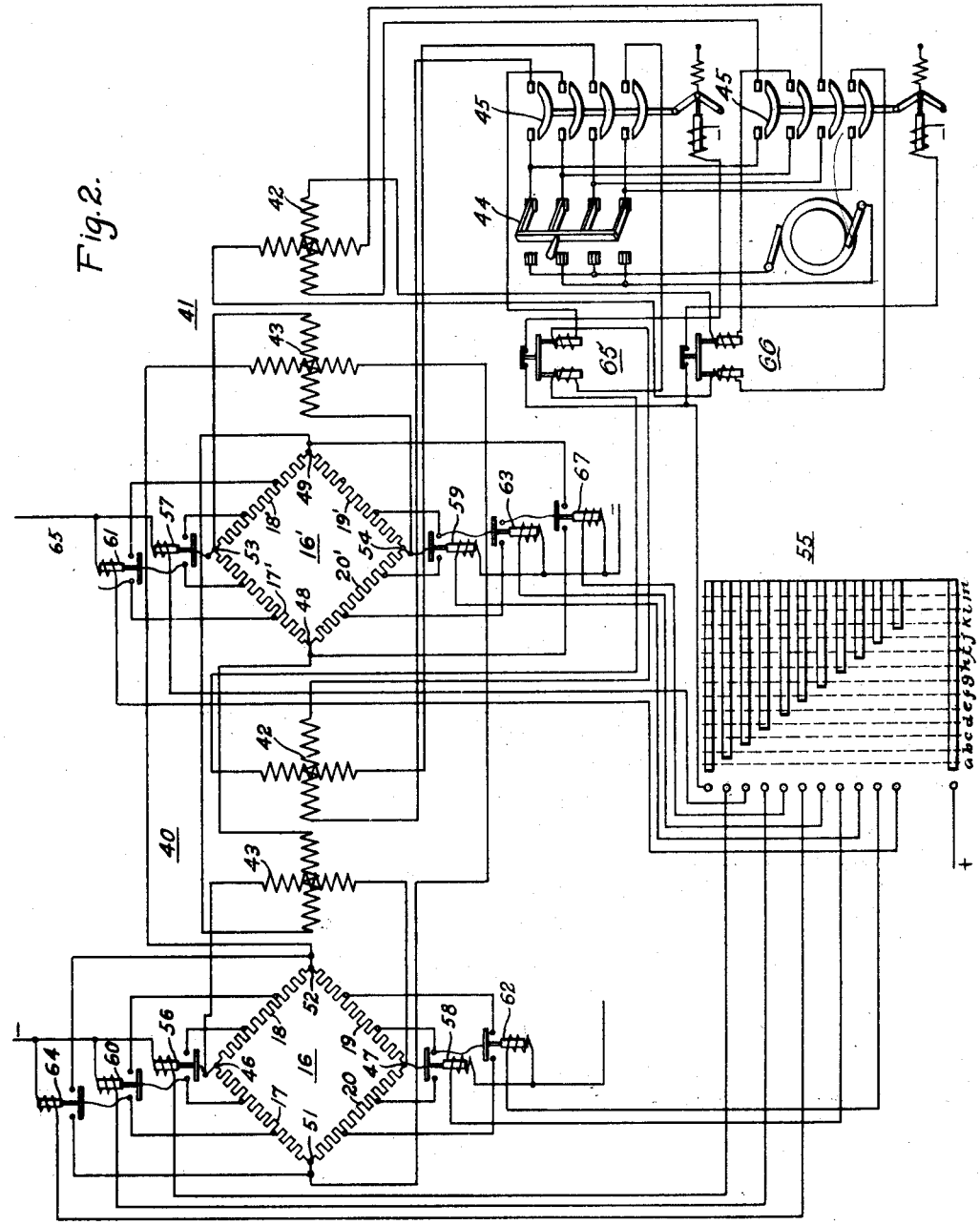

1,695,891

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

Original application filed February 5, 1921, Serial No. 442,764. Divided and this application filed August 28, 1925. Serial No. 53,061.

My invention relates to polyphase motors and it has special relation to a system of acceleration therefor.

One object of my invention is to provide a system whereby a smoother and more gradual acceleration of the motor or motors shall be accomplished than has heretofore been possible.

Another object of my invention is to provide a plurality of conductor paths for the current from each phase winding, utilizing, however, various combinations of the same paths for the different currents.

A further object of my invention is to provide a method of acceleration for a plurality of motors which will not affect the balanced pulling torque of the motors.

A still further object of my invention is to provide a method of connecting the secondary windings of a plurality of motors to a single resistor or to a plurality of resistors so that there will be no interchange of currents between the motors.

It is a further object of my invention to enable a plurality of motors of different phase relation to be properly controlled from a single rheostat.

Other and more specific objects of my invention will be apparent from the following description and claims.

The present invention will hereinafter be described as applied to the secondary windings of polyphase induction motors but it will be understood to be equally applicable to other alternating-current motors and to primary, as well as to secondary, windings.

In the control of induction motors, the effective speed of a motor beyond a predetermined point depends upon the total resistance in circuit with the secondary windings thereof.

As is well known, the effect of resistance in circuit with the secondary winding is to increase the "slip" between the primary and secondary windings to delay the full-speed operation of the motor. However, when starting, it is desirable to increase the rotor-circuit resistance to produce the maximum torque. At the same time, it is also desirable to economize, as far as possible, in the amount of resistance that is inserted, without impairing the efficiency of the motors. Accordingly, where a single resistance path is utilized between two individual windings, an appreciable saving in resistance elements is obtained.

It will be readily understood that, when a single resistor is connected in circuit with the two secondary phase windings of a two-phase motor and is disposed to serve as a conductor for the current flowing in both of the phase windings, any change in its value, which may be effected by short-circuiting a section of it, will affect the current flowing in both of the phase windings. Therefore, by varying the ohmic value of a single resistor connected in circuit with the two secondary phase windings of a motor, the same results may be obtained as is effected by varying simultaneously the ohmic value of two separate resistors each connected in circuit with a different secondary phase winding.

By the application of this principle to the acceleration of polyphase induction motors, it is possible to obtain, with a relatively small number of switches, the results heretofore obtained with a relatively large number of switches.

The desired result for one or more motors is secured by using a type of resistor wherein the resistor sections have no common terminal but are all connected to form a continuous resistance path to which each of the secondary phase windings is connected.

The acceleration is shown as accomplished by the use of electromagnetic switches but any of the well-known methods of short-circuiting resistors may be used without affecting the result obtained by the principles of the present invention.

The present invention will best be understood by reference to the accompanying drawings, wherein Figure 1 is a diagrammatic view of one form of circuits and apparatus embodying my invention;

Fig. 2 is a diagrammatic view of a modified form of circuits and apparatus embodied in my invention, as applied to two motors and utilizing two resistors; and Referring to Fig. 1, a two-phase induction motor 10, having primary or stator windings 11 and secondary or rotor windings 12, is shown. The primary windings are energized from a suitable supply circuit when a knife-blade switch 13 is closed and the coil of an electromagnetic device 14 is energized to close the main-line contactor 15.

Connected in series relation with the secondary windings 12 is a resistor 16, having four arms or sections 17, 18, 19 and 20, respectively. The arms of the resistor are here disposed in the form of a diamond and the adjacent ends of each arm are conneced together so that a continuous path is provided through said resistor. One winding of the secondary is connected to the resistor at the oppositely-disposed junction points 22 and 23, while the other winding of the secondary is joined to the oppositely-disposed points 24 and 25, these connections being thus made at the junction-points of the resistor sections.

The current from the secondary winding connected at point 22 will traverse one path through resistor arms 18 and 17 and another path through arms 19 and 20, emerging at the connection 23. The current from the winding connected at tap 24 will traverse one path through arms 17 and 20, and a second path through arms 18 and 19, emerging at tap 25. In other words, the currents from each phase winding will traverse all four sections of the resistor.

The connection of the respective phase windings at oppositely-disposed points of the resistor renders the potential value at these points zero for the current from the oppositely-connected phase winding. Hence, there will be no tendency for the currents to intermingle, and each current will traverse the resistor arms beyond these points to the proper tap. That is, the current from tap 22 will not be diverted at taps 24 and 25 but will continue its independent path, through arms 17 and 20, to tap 23, by reason of the fact that the potential value at taps 24 and 25 is zero.

A controller 26 is shown having seven positions, $a$ to $g$, inclusive, for selectively shunting sections of the resistor.

In position $a$, the controller 26 will be energized and main contactor 15 will be closed in a well-known manner. In position $b$, the coil of an electromagnetic switch 28 will be energized, thereby closing this switch to shunt a portion of sections 17 and 18 of the resistor. Accordingly, this action materially decreases the value of these resistor arms, thereby materially affecting the current from one phase winding. The opposite phase winding is only slightly affected. However, the effect upon the motor speed is equivalent to that which would be obtained by cutting out approximately one-half as much resistance simultaneously in all sections of the resistor.

When the controller is moved to position $c$, the coil of electromagnetic switch 27 is energized, thereby closing this switch to shunt a portion of the resistor arms 19 and 20. This shunted portion is preferably equivalent, in ohmic value, to the shunted portion of the arms 17 and 18, thereby "balancing" these arms. The shunting of this portion of the arms 19 and 20 again increases the current from the taps 24 and 25. Likewise, since the two paths between taps 22 and 23 have equal amounts shunted therefrom, these paths are balanced, and the current from the winding connected to these taps is caused to materially increase, this action being the reverse of that just described for the switch 28.

From the foregoing statements, it will be apparent that, when the first phase-winding circuit is adjusted, the resultant speed of the rotor is increased to an extent equivalent to that which would be obtained by simultaneously excluding from the circuits of both windings resistance of approximately one-half the value of that shunted in the individual winding circuits. When the second step is completed, the resultant speed of the rotor is further increased and, at the same time, the individual windings again become balanced.

Upon moving the controller to position $d$, the coil of electromagnetic switch 31 is energized to close this switch, thereby shunting a second portion of the arms 17 and 18. The effect of the closure of switch 31 is the same as that heretofore described for the closure of switch 28. Consequently, the total slip of the secondary windings, with reference to the primary windings, is again decreased a half step.

Upon moving the controller to position $e$, the coil of electromagnetic switch 29 is energized to close this switch and shunt an additional portion of the arms 19 and 20, preferably of an ohmic value corresponding to that of the shunted portion of arms 17 and 18. The effect of the closure of this switch is the same as that described for switch 27.

Upon moving the controller to position $f$, the coil of electromagnetic switch 32 is energized, thereby closing this switch to shunt all of arms 19 and 20 of the resistor, with an effect upon the motor equivalent to that described for switches 27 and 29. The entire resistor is now short-circuited to approximately synchronize the mechanical speed of the secondary winding with respect to the speed of the rotating field in the primary winding.

In order to hold the shunted portions of the resistor sections out of the circuit, the switches 27 and 28 are electrically connected to tap-points 25 and 24, respectively, by means of flexible connections 34. Similarly, each of the movable members of the electromagnetic switches 29, 31 and 32 is electrically connected to the preceding switch by means of similar flexible connections 34. It will be understood, of course, that there are various other ways for connecting these switches together, the illustrated flexible connection being merely a conventional showing.

In order to protect the motor 10, an electromagnetic switch 33 is provided for controlling the actuating circuit of the line switch 15. As shown, the actuating coils of the switch 33 are connected in series with the primary phase windings 11 of the motor 10. Therefore, upon the flow of an excessive current in the primary windings 11 of the motor 10, the switch 33 is actuated to interrupt the energizing circuit of the actuating coil 14 of the switch 15 to permit the latter to open.

Referring to Fig. 2, a system of acceleration for two polyphase induction motors is shown, embodying the principles described for the single motor illustrated in Fig. 1, with this difference:—The secondary windings of the two motors are shown interconnected between two resistors 16 and 16', each having sections 17, 18, 19 and 20 and 17', 18', 19' and 20' respectively, as indicated in Fig. 2. This method of connecting the secondaries accomplishes even finer steps in the acceleration of the motors.

The two motors 40 and 41, having primary windings 42 and 42' and secondary or rotor windings 43 and 43', respectively, are energized by closing the knife-blade switch 44 and the subsequent closure of the main-line contactors 45 and 45'.

One winding of the rotor 43 of the motor 40 is connected to points 46 and 47 of the resistor 16 that is shown at the left in Fig. 2. The opposite phase winding of this rotor is connected to points 48 and 49 of the resistor 16' that is shown at the right in Fig. 2. It will be noted that the connections for these windings are at the opposite points of the respective resistors but this arrangement is not essential to the present invention.

The secondary winding 43' of the motor 41 that is connected to points 51 and 52 of the left-hand resistor, is in opposite phase relation to the winding 43 of the motor 40 that is connected to points 46 and 47 of said left-hand resistor.. The other secondary phase winding of motor 41 is connected to points 53 and 54 of the right-hand resistor. Likewise, this winding is in opposite phase relation to the secondary winding of motor 40 that is connected to points 48 and 49.

As described for Fig. 1, current entering at connection 52 of the left-hand resistor of Fig. 2 will traverse one path through sections 18 and 17 and a second path through sections 19 and 20, emerging at point 51, while that entering at tap 46 will traverse one path through sections 17 and 20 and a second path through sections 18 and 19, emerging at tap 47. What is said for the left-hand resistor of Fig. 2 applies equally to the right-hand resistor.

A controller 55, having thirteen steps, a to m, inclusive, is shown which, when moved to position a, is energized in a well-known manner.

When the controller is moved to position b, the coil of electromagnetic switch 56 is energized, thereby closing it to shunt a portion of the arms 17 and 18 of the left-hand resistor. Accordingly, this action will affect the current in one phase winding of motor 40 and will tend to relatively unbalance the motors. However, the dissymmetry is so small that it is not harmful, either to the motors or in its effect upon the pulling torque of the motors. On the other hand, this unbalanced condition of the windings tends to reduce the fluctuations in the currents.

When the controller is moved to position c, the coil of electromagnetic switch 57 is energized, thereby closing this switch to shunt a portion of arms 17' and 18' of the right-hand resistor. When this switch is closed, the current of one winding of the secondary of motor 41, is increased, and the two motors again have the same neutral point.

When the controller is moved to position d, the coil of electromagnetic switch 58 is energized, thereby closing this switch to shunt a portion of the arms 19 and 20 of the left-hand resistor, preferably of the same ohmic value as the previously shunted portion of this resistor. This action will have the effect of again increasing the currents between the taps 46 and 47. Likewise, the two paths between taps 51 and 52 each having an equal amount shunted therefrom; these paths are balanced and the current from the winding connected at these taps is caused to materially advance. It will be remembered that the winding connected at these points is located upon the motor 41, while the co-balanced winding is located upon the motor 40. However, the motors are off neutral by reason of the fact that the operating condition of the winding that is joined to taps 53 and 54 of the right-hand resistor is advanced with reference to the winding connected at points 48 and 49.

When the controller is moved to position e, the coil of electromagnetic switch 59 is energized, thereby closing this switch to shunt a portion of the arms 19' and 20' of the right-hand resistor. This action will have the same effect upon the phase winding as has been described for switch 58, only upon the opposite phase windings from those affected by that switch.

At this point, all arms of the resistors are preferably balanced, thereby balancing the operating condition of all windings, and substantially exactly balancing the pulling torque of the motors.

In each of the following positions, namely f to m, inclusive, the electromagnetic switches 60, 61, 62, 63, 64, and 67 are closed in the sequence given, and, inasmuch as their respective effects upon the windings and the pulling torque of the motors, as well as their order of closure, are the same as those described for the closing of switches 56, 57, 58 and 59, no detailed reference will be made to these remaining switches.

With a view to protecting the motors 40 and 41, overload relays 65 and 66 are provided. As will be observed, the actuating coils of the overload relay 65 are connected in series with the primary windings of the motor 40 while the actuating coils of the overload relay 66 are connected in series with the primary windings of the motor 41. The relay 65 is disposed to control the actuating coil of the line switch 45 while the relay 46 is connected to control the actuating coil of the line switch 45'. Therefore, when an excessive current flows in either of the primary windings 42 and 42', the relay 65 or 66, respectively, may be actuated to effect the opening of the line switches 45 and 45'.

The herein described arrangement of resistors and the method of shunting portions thereof accomplish two very important ends. In the first place, this arrangement permits the windings of the motor secondary to be so connected to the resistor that the individual currents from the windings utilize all the resistance elements and the same paths. The arrangement thus accomplishes a desirable economy in the amount of resistance used. Secondary, by selectively shunting portions of the resistor sections so connected to the secondary windings, each shunting switch will provide an operating step which, heretofore, has been accomplished by twice the number of switches. This arrangement thus effects an economy in the number of switches employed. The combination of arrangements, such as shown in Fig. 2, produces a finer gradation of the acceleration than has heretofore been accomplished, at the same time greatly simplifying the necessary circuits and connections.

It should be borne in mind that the finer gradation of the acceleration is accomplished by reason of the fact that the pulling torque of the motors is affected only to the extent that the total resistance in circuit with said secondary winding is affected and does not accelerate it to the extent that the individual phase windings are acted upon.

Accordingly, from this description, it will be apparent that any shunting of a portion of any one of the resistance paths will affect the current in one phase winding of each motor, thereby maintaining the motors exactly balanced. Yet, the acceleration accomplished by shunting a single portion of one resistor section, even though it be one-half of that section, is so small, compared to the total resistor value, that the accelerating steps are very gradual. Shunting one-half of the next resistor further affects the currents in these phase windings of each motor, still maintaining the motors balanced, and the acceleration is advanced another step. The remaining phase windings are likewise affected in sequence and this gradual advancement continues until full speed is reached with each step slightly affecting the motor speed. The value of this result in railway work has been dwelt upon in the past, so that the advance which this invention makes in this direction will be readily appreciated.

The important advantages derived from the herein described method of acceleration are very desirable in railway-motor operation. These advantages are, in no way, minimized by the possibilities of any conflicting circulating currents between the two motors.

No conflicting circulating currents are possible between motors connected in the manner herein described for the reason that, at the points where the windings of the opposite motors are connected to the resistor, a constant neutral point is maintained between the currents from the windings traversing these resistor paths so that the currents will continue to follow their individual paths past these neutral points without interchange between motors.

Accordingly, while the acceleration of the windings during the major portion of the accelerating period is unbalanced, the steps are so graduated that the unbalanced feature does not affect, in any way the operative value of the motors.

I do not wish to be restricted to the specific circuit connections or arrangements of parts herein set forth, as various modifications thereof may be made without departing from the spirit and scope of my invention. I desire, therefore, that only such limitations shall be imposed as are indicated by the appended claims.

I claim as my invention:

1. In a control system for accelerating motors, in combination, a plurality of polyphase induction motors, each having primary and secondary windings, a plurality of endless resistors each having a plurality of the secondary windings of the motor connected thereto with balanced resistor sections between the terminals of each winding and adjacent terminals of different windings, and means for selectively shunting portions of the resistor sections to effect the acceleration of the motors substantially without interchange of current between the motors.

2. In a control system for accelerating motors, in combination, a plurality of polyphase induction motors, each having primary and secondary windings, two endless resistors having the secondary windings of the motors connected thereto with balanced resistor sections between the terminals of each winding, and means for shunting portions of the different sections of the resistor to effect the acceleration of the motors substantially without interchange of current between the motors.

3. In a control system for polyphase motors, in combination, primary and secondary motor windings, a resistor connected in circuit with the secondary windings, the terminals of the windings being substantially evenly spaced on the resistor whereby each section of the resistor is used as a conductor for current flowing in more than one phase winding, and means for alternately and progressively short-circuiting the respective sections of the resistor connected in the circuit of the different motor windings to control the current flowing in the windings, thereby to control the speed of the motors.

4. In a system of control for polyphase induction motors having primary and secondary phase windings, in combination, a resistor connected to a plurality of the phase windings to provide a plurality of circuits with a common resistor, and means for alternately and progressively short-circuiting sections of the resistor located in the respective circuits to control the current flowing in the phase windings.

5. In a system of control for polyphase induction motors having primary and secondary phase windings, in combination, a loop resistor connected to a plurality of the phase windings to provide a plurality of circuits with a common resistor, and means for alternately and progressively short-circuiting sections of the resistor located in the respective circuits to control the flow of current in the secondary phase windings.

6. In a system of control for polyphase induction motors having primary and secondary phase windings, in combination, an endless resistor connected to a plurality of the secondary phase windings, with balanced resistor sections between the terminals of each winding and adjacent terminals of the different windings, and means for alternately and progressively short-circuiting portions of the respective balanced sections of the resistor connected in the circuits of the secondary phase windings to control the flow of current in the secondary phase windings.

In testimony whereof, I have hereunto subscribed my name this 4th day of August, 1925.

CHARLES LE G. FORTESCUE.